US010346392B2

(12) United States Patent
Fondekar et al.

(10) Patent No.: US 10,346,392 B2
(45) Date of Patent: Jul. 9, 2019

(54) METHODS AND SYSTEMS FOR TRANSACTION PROCESSING

(71) Applicant: Tata Consultancy Services Limited, Mumbai (IN)

(72) Inventors: Dipti Mohan Fondekar, Mumbai (IN); Manoj Digambar Soman, Mumbai (IN); Mahesh Kshirsagar, Mumbai (IN); Kumaran Sethuraman, Mayladuthurai (IN); Jayakumar Susaimari, Panruti (IN)

(73) Assignee: Tata Consultancy Services Limited, Mumbai (IN)

( * ) Notice: Subject to any disclaimer, the term of this patent is extended or adjusted under 35 U.S.C. 154(b) by 526 days.

(21) Appl. No.: 15/074,436

(22) Filed: Mar. 18, 2016

(65) Prior Publication Data

US 2017/0039237 A1 Feb. 9, 2017

(30) Foreign Application Priority Data

Aug. 6, 2015 (IN) .......................... 2976/MUM/2015

(51) Int. Cl.
*G06F 17/20* (2006.01)
*G06F 16/23* (2019.01)
(Continued)

(52) U.S. Cl.
CPC ........ *G06F 16/2379* (2019.01); *G06F 3/0482* (2013.01); *G06F 3/04847* (2013.01);
(Continued)

(58) Field of Classification Search
CPC ............... G06F 16/2379; G06F 3/0482; G06F 3/04847; G06F 16/245; G06F 16/2365; G06Q 20/401
See application file for complete search history.

(56) References Cited

U.S. PATENT DOCUMENTS 6,636,990 B1 * 10/2003 Wadewitz ............. G06F 11/004
714/2
8,495,715 B2 * 7/2013 Henderson .............. G06F 21/46
726/6
(Continued)

OTHER PUBLICATIONS

Cohen, Barry R., "Double-Key Data Entry/Verification in SASe Software Part of Downsizing a Clinical Data System to the OS/2* Operating System", SAS Community, pp. 97-103, (1993), http://www.sascommunity.org/sugi/SUGI93/Sugi-93-16%20Cohen.pdf.
(Continued)

*Primary Examiner* — Mohammed H Zuberi
(74) *Attorney, Agent, or Firm* — Finnegan, Henderson, Farabow, Garrett & Dunner LLP

(57) ABSTRACT

This disclosure relates generally to transaction processing, and more particularly to method and system for transaction processing in an application. In one embodiment, the method includes facilitating selection of an overlay application corresponding to the application. The application includes at least one window having a plurality of fields and is rendered in a first UI. At least one field of the plurality of fields is masked to obtain at least one masked field in the first UI. A second UI corresponding to the at least one window is rendered. The second UI is associated with the overlay application and includes at least one field blank field corresponding to the at least one field masked field in the first UI. Entering data is enabled in the at least one blank field in the second UI, and the data entered is compared with a pre-populated data to determine validity of the transaction.

13 Claims, 6 Drawing Sheets

(51) Int. Cl.
*G06F 3/0482* (2013.01)
*G06F 3/0484* (2013.01)
*G06Q 20/40* (2012.01)
*G06F 16/245* (2019.01)

(52) U.S. Cl.
CPC ........ *G06F 16/2365* (2019.01); *G06F 16/245* (2019.01); *G06Q 20/401* (2013.01)

(56) References Cited

U.S. PATENT DOCUMENTS

| | | | | |
|---|---|---|---|---|
| 8,539,597 | B2* | 9/2013 | Arasaratnam | G06F 21/602 |
| | | | | 726/26 |
| 8,730,836 | B2* | 5/2014 | Cohen | H04K 1/00 |
| | | | | 370/230 |
| 8,850,044 | B2* | 9/2014 | Cohen | G06F 21/6254 |
| | | | | 709/229 |
| 8,862,999 | B2* | 10/2014 | Gupta | G06F 16/254 |
| | | | | 715/736 |
| 8,898,796 | B2* | 11/2014 | Ben-Natan | H04L 63/20 |
| | | | | 726/1 |
| 8,929,208 | B2* | 1/2015 | Cohen | H04L 51/12 |
| | | | | 370/229 |
| 8,930,381 | B2* | 1/2015 | Raghunathan | G06F 21/6254 |
| | | | | 707/756 |
| 8,930,410 | B2* | 1/2015 | Alton | G06F 16/2455 |
| | | | | 707/802 |
| 8,935,615 | B2* | 1/2015 | Grandemenge | G06F 21/83 |
| | | | | 715/743 |
| 8,983,985 | B2* | 3/2015 | Chen | G06F 16/00 |
| | | | | 707/757 |
| 9,100,373 | B2* | 8/2015 | DeLuca | H04L 63/0428 |
| 9,116,765 | B2* | 8/2015 | McLachlan | G06F 21/54 |
| 9,152,733 | B2* | 10/2015 | Furuya | G06F 21/31 |
| 9,195,853 | B2* | 11/2015 | Fox | G06F 21/6254 |
| 9,224,007 | B2* | 12/2015 | Fox | G06F 21/62 |
| 9,305,180 | B2* | 4/2016 | Cardno | G06F 21/6227 |
| 9,323,949 | B2* | 4/2016 | Gupta | G06F 21/6254 |
| 9,336,324 | B2* | 5/2016 | Lomme | G06F 16/9574 |
| 9,406,157 | B2* | 8/2016 | Liu | G06T 11/60 |
| 9,411,708 | B2* | 8/2016 | Bhattacharya | G06F 11/362 |
| 9,589,146 | B2* | 3/2017 | Averdunk | G06F 21/6209 |
| 9,600,134 | B2* | 3/2017 | Fox | G06F 3/0481 |
| 9,641,537 | B2* | 5/2017 | Cohen | G06F 21/10 |
| 9,659,188 | B2* | 5/2017 | Cohen | G06F 21/6263 |
| 9,665,697 | B2* | 5/2017 | Bostick | G06F 16/35 |
| 9,892,278 | B2* | 2/2018 | Avrahami | G06F 21/6245 |
| 9,946,810 | B1* | 4/2018 | Trepetin | H04L 63/0428 |
| 9,953,176 | B2* | 4/2018 | Koo | G06F 21/6209 |
| 10,121,023 | B2* | 11/2018 | Akula | G06F 21/6245 |
| 10,169,599 | B2* | 1/2019 | Fox | G06F 21/6218 |
| 10,242,000 | B2* | 3/2019 | Antonatos | G06F 16/00 |
| 2003/0023476 | A1* | 1/2003 | Gainey | G06Q 10/06398 |
| | | | | 705/7.42 |
| 2007/0088732 | A1* | 4/2007 | Chen | G06F 16/24552 |
| 2011/0218980 | A1* | 9/2011 | Assadi | G06F 16/2329 |
| | | | | 707/700 |
| 2012/0169856 | A1* | 7/2012 | Ahmed | G06Q 10/08 |
| | | | | 348/61 |
| 2013/0054454 | A1* | 2/2013 | Purves | H04L 67/306 |
| | | | | 705/41 |
| 2013/0152158 | A1* | 6/2013 | Yoshihama | G06F 21/60 |
| | | | | 726/1 |
| 2014/0164241 | A1* | 6/2014 | Neuwirth | G06Q 20/12 |
| | | | | 705/44 |
| 2014/0208199 | A1* | 7/2014 | Peleg | G06Q 30/0277 |
| | | | | 715/234 |
| 2015/0019944 | A1* | 1/2015 | Kalgi | G06Q 20/227 |
| | | | | 715/205 |

OTHER PUBLICATIONS

"Two pass verification", Wikipedia, (2013), https://en.wikipedia.org/wiki/Two_pass_verification.

"ABBYY FlexiCapture", ABBYY, (2015), http://www.abbyy.com/flexicapture/features/.

"Survey software and tools for professional researchers", StatPac for Windows User's Manual, Data Manager, Double Entry Verification, p. 68 (2010) https://statpac.com/manual/index.htm?turl+doubleentryverification.htm.

* cited by examiner

METHODS AND SYSTEMS FOR TRANSACTION PROCESSING

PRIORITY CLAIM

This U.S. patent application claims priority under 35 U.S.C. § 119 to: India Application No. 2976/MUM/2015, filed on Aug. 6, 2015. The entire contents of the aforementioned application are incorporated herein by reference.

TECHNICAL FIELD

This disclosure relates generally to transaction processing, and more particularly to method and systems for processing of transactions in transaction-oriented applications.

BACKGROUND

Currently, transaction processing systems are extensively utilized in multitude of businesses for managing business-sensitive data. For example, the transaction processing systems are utilized in banks, travel companies, and other such businesses. The accuracy of business sensitive data is of prime importance for such businesses for ensuring smooth running of their operations, thus utmost care is taken that the transaction processing systems are designed in a manner to ensure that the business sensitive data is properly entered and updated. The inventors here have recognized several technical problems with such conventional systems, as explained below.

Existing transaction processing systems involves intensive manual effort. For example, an associate (referred to as a 'maker associate') enters data associated with the transactions in an information technology (IT) application. During the data entry, the maker associate refers to different sources of information such as excel spread sheets, word documents, PDF documents, image documents, e-mail, and so on. Once the data is entered by the maker associate, another associated (referred to as a 'checker associate') verifies the complete data entry using a manual verification, also referred to eye-ball verification, in which the checker associate manually read through the data to ensure correctness of the data entered by the checker associate. Upon verification, the checker associate may approve or reject the transaction.

Most of the times, such eye-ball verification is performed for a large volume of data including few hundreds of fields of data being entered on a daily basis in the IT application. In various scenarios, since the verification being performed by the checker associate is entirely manual verification (i.e. only through eye-ball check). Verification of such large amount of data may be prone to human errors, particularly, due to the fatigue and pressures involved in verifying few hundreds of fields being data entered on daily basis.

SUMMARY

Embodiments of the present disclosure present technological improvements as solutions to one or more of the above-mentioned technical problems recognized by the inventors in conventional systems. For example, in one embodiment, a processor-implemented method for transaction processing is provided. The method includes, facilitating, via one or more hardware processors, selection of an overlay application corresponding to an application. The application includes at least one window having a plurality of fields and being rendered in a first user interface (UI). Further, the method includes, masking, via one or more hardware processors, at least one field of the plurality of fields in the first UI to obtain at least one masked field in the first UI. Furthermore, the method includes, accessing, via one or more hardware processors, a prepopulated data associated with the at least one masked field of the application. A second UI corresponding to the at least one window is rendered, via one or more hardware processors. The second UI is associated with the overlay application and includes at least one blank field corresponding to the at least one masked field in the first UI. Additionally, the method includes enabling, via one or more hardware processors, entering of data in the at least one blank field in the second UI. Moreover, the method includes comparing, via one or more hardware processors, the data entered in the at least one blank field with the prepopulated data for determining whether the data entered matches with the prepopulated data. The matching of the data entered in the at least one blank field with the prepopulated data based on comparing facilitates in validating the transaction.

In another embodiment, processor-implemented system for transaction processing is provided. The system includes a memory storing instructions; and one or more hardware processors coupled to said memory. Said one or more hardware processors are configured by said instructions to facilitate selection of an overlay application corresponding to an application. The application includes at least one window having a plurality of fields and being rendered in a first user interface (UI). Further, said one or more hardware processors are configured by said instructions to mask at least one field of the plurality of fields in the first UI to obtain at least one masked field in the first UI. Furthermore, said one or more hardware processors are configured by said instructions to access a prepopulated data associated with the at least one masked field of the application. Also, said one or more hardware processors are configured by said instructions to render a second UI corresponding to the at least one window. The second UI is associated with the overlay application and includes at least one blank field corresponding to the at least one masked field in the first UI. Moreover, said one or more hardware processors are configured by said instructions to enable entering of data in the at least one blank field in the second UI. Said one or more hardware processors are configured by said instructions to compare the data entered in the at least one blank field with the prepopulated data for determining whether the data entered matches with the prepopulated data. Matching the data entered in the at least one blank field with the prepopulated data based on comparing facilitates in validating the transaction.

In yet another embodiment, a non-transitory computer-readable medium having embodied thereon a computer program for executing a method for transaction processing is provided. The method includes, facilitating, via one or more hardware processors, selection of an overlay application corresponding to an application. The application includes at least one window having a plurality of fields and being rendered in a first user interface (UI). Further, the method includes, masking, via one or more hardware processors, at least one field of the plurality of fields in the first UI to obtain at least one masked field in the first UI. Furthermore, the method includes, accessing, via one or more hardware processors, a prepopulated data associated with the at least one masked field of the application. A second UI corresponding to the at least one window is rendered, via one or more hardware processors. The second UI is associated with the overlay application and includes at least one blank field corresponding to the at least one masked field in the first UI. Additionally, the method includes enabling, via one or more hardware processors, entering of data in the at least one blank field in the second UI. Moreover, the method includes comparing, via one or more hardware processors, the data entered in the at least one blank field with the prepopulated data for determining whether the data entered matches with the prepopulated data. The matching of the data entered in the at least one blank field with the prepopulated data based on comparing facilitates in validating the transaction.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1A:
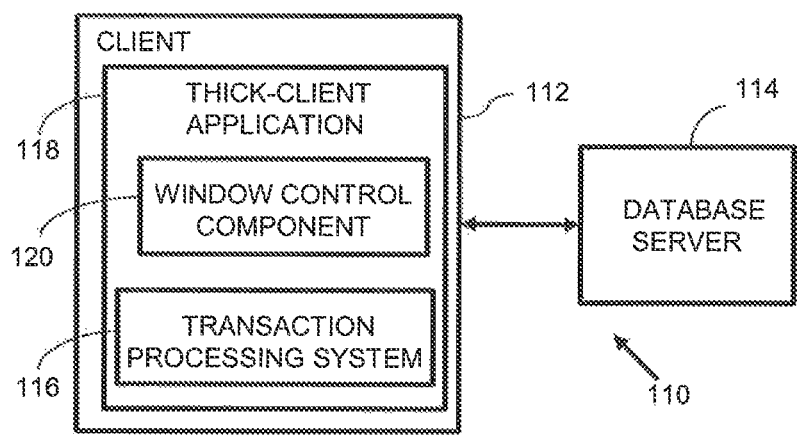
FIGS. 1A and 1B illustrate architectures for processing of transactions associated with an application according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure relates to a systems and methods for processing of transaction pertaining to data entry in transaction-oriented applications. Herein, the term 'transaction' may refer to an individual and indivisible process being performed by a system. Such a system that is configured to perform processing of a transaction may be referred to as a transaction processing system. The transaction processing system may include hardware and software that may be collectively configured to host an IT application for performing transactions pertaining to a business. The transaction processing systems may include systems that manage airline reservations, payroll, employee records, banking activities, manufacturing, shipping, and so on. Various embodiments presented herein disclose systems and methods for processing transactions in a robust and accurate manner.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The methods and systems are not limited to the specific embodiments described herein. In addition, the method and system can be practiced independently and separately from other modules and methods described herein. Each device element/module and method can be used in combination with other elements/modules and other methods.

For a firmware and/or software implementation the methodologies can be implemented with modules (e.g., procedures, functions, and so on) that perform the functions described herein. Any machine readable medium tangibly embodying instructions can be used in implementing the methodologies described herein. For example, software codes and programs can be stored in a memory and executed by a processing unit.

In another firmware and/or software implementation, the functions may be stored as one or more instructions or code on a non-transitory computer-readable medium. Examples include computer-readable media encoded with a data structure and computer-readable media encoded with a computer program. The computer-readable media may take the form of an article of manufacturer. The computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk, and Blue-ray disc where disks usually reproduce data magnetically, while discs reproduce data optically with lasers. Combinations of the above should also be included within the scope of computer-readable media.

The manner, in which the system and method for processing transactions shall be implemented, has been explained in details with respect to the FIGS. 1A through 5. While aspects of described methods and systems for processing transactions can be implemented in any number of different systems, utility environments, and/or configurations, the embodiments are described in the context of the following exemplary system(s). Herein, the transaction may be related to a business/service/entity/enterprise.

During transaction processing in a business or a bank, there are a number of scenarios whereby a 'maker' associate keys-in/enters data pertaining to transactions in a Customer IT application by referring to different sources of information such as excel spread sheets, word documents, PDF documents, and so on. A 'checker' associate access the data entered by the 'maker' associate, and verifies the entered data. For instance, if the data entered by the maker associate is determined to be correct, the checker associate approves the transaction, and if the data entered is determined to be false, the maker associate rejects the transaction n order to verify the transaction, the checker associate has to ensure the correctness of the data entered by the maker associate.

Various embodiments of the present disclosure provide methods and systems for ensuring the validity of transactions associated with applications. For instance, various embodiments provides a system that facilitates in automatically configuring an overlay application corresponding to the customer IT application such that the overlay application includes certain key fields of the customer IT application. A checker associate enters the values of the key fields into the customer IT application by referring to same source of data as was referred by the maker associate. Also, the system enables in masking the data of the key-fields in the customer IT application while the maker associate enters the corresponding data in the overlay application. The system compares field-by-field values entered in the overlay application with the field values field entered in the customer IT application. On matching of the field values entered in the customer IT application with the corresponding values in the overlay application, the system enables approval of the transaction. In various embodiments, the system disables the approval of the transaction till the data entered in the overlay application matches with the data entered in customer IT application.

The customer IT application may hereinafter be referred to as an 'application'. Examples of the architecture of an IT application are explained further with reference to FIGS. 1A and 1B. In an example embodiment, the application may be a thick-client application, as illustrated in FIG. 1A. In another embodiment, the application may be a web application also referred to as a web-based application), as illustrated in FIG. 1B.

Referring to FIG. 1A, the architecture 110 for transaction processing includes a thick client (for example, a client 112), a database server 114 and a transaction processing system 116. A 'thick-client' application, for instance the thick client application 118 is an application associated with a thick client (or a computing device) such as the client 112. A thick-client is a client in a client-server architecture (for example, the architecture 110) or network that may provide functionality independent of the server. The thick-client applications include an operating system and can be used offline (without being connected to a network or a server). In thick-client applications, such as thick-client application 118, primarily processing is performed at the client (or the computing device), and the server such as the database server 114 may be accessed occasionally, for instance, for the purpose of accessing data.

In the present embodiment, the thick-client application 118 may include a window control component 120. The window control component 120 for the thick-client application 118 may refer to at least one handler of the thick-client application 118. The at least one handler facilitates in handling an event during the transaction processing. For example, the handlers can provide a logical configuration for accessing and manipulating the application on occurrence of any event (such as a user event). Herein, the term 'event' may refer to an event associated with an interaction of a user with the application 118.

Figure 1B:
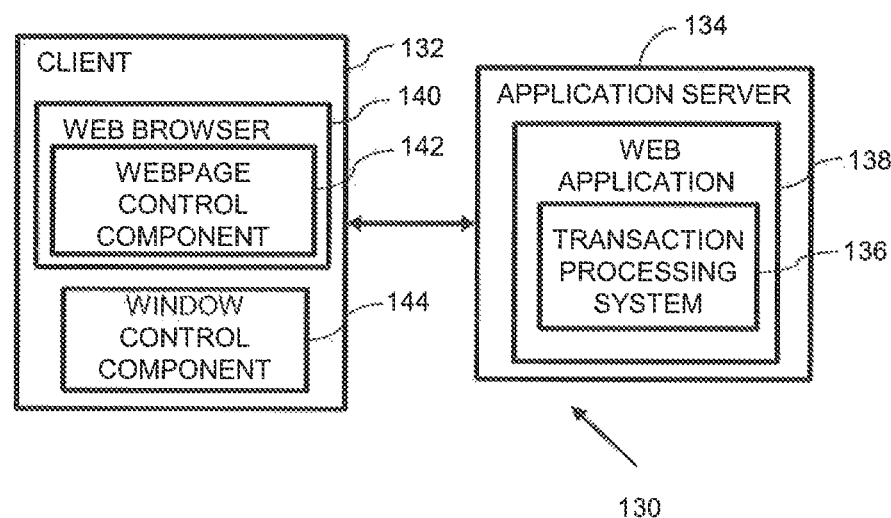

Referring now to FIG. 1B, an architecture 130 for transaction processing is illustrated in accordance with another example embodiment, where the application is a web application (also referred to as a web-based application). The web application is stored on a remote server and uses a web browser as a client. In particular, the web application is delivered over the internet through a browser interface. The architecture 130 is shown to include a client 132, an application-server 134, and a transaction processing system 136. Herein, the client may be assumed to include a client device 132, such as a mobile phone, a laptop, a personal digital assistant (PDA), a computer, and so on. It will be noted that the client device may include various other peripheral components and system components, however said peripheral components and system components are not shown here for the brevity of description.

In this scenario, the client 132 may communicate with the application server 134 over a communication network. The communication network may include any combination of Local Area Networks (LANs), Wide Area Networks (WANs), Internet Protocol (IP) networks, phone networks, Public Services Telephone Networks (PSTN), wireless networks, cellular networks, Wi-Fi networks, Bluetooth networks, cable networks, data buses, or the like, or any combination thereof used for transferring information and/or data between the client 132 and the application server 134.

The application server 134 is configured to operate the web application, for instance the web application 138. The web application 138 may include software, and a database containing multiple webpages (or windows) and data for exchanging with the client 132 during the transaction processing. For instance, the web pages (not shown) may include multiple windows that may be traversed for completing an event. A user may access the web application 138 and webpages associated with the web application using the client 132. For instance, the user may open a web browser 140 within the client 132 and send a request over a communication network to the web application 138. The web application 138 may send a webpage back to the web browser 140 in response to the request. The web browser 140 may load and render the webpage on the client 132 using a webpage control component 142.

In the present embodiment, the client 132 includes a window control component 144 for controlling events associated with an access to the application 138. For example, the window control component 144 may be indicative of the page layout associated with the application, and is responsible for controlling the traversal through the application. In particular, the window control component may refer to logic and data that may facilitate in controlling page layout associated with the application 138. The window control component 144 for a web application 138 may include document object model (DOM) structure of the page layout associated with the web application 138. Webpage may be configured into a Document Object Model (DOM) that defines a logical structure of an electronic document and the way the electronic document (for instance, a webpage) is accessed and manipulated. As an example, the web application 138 may include Hypertext Markup Language (HTML), Extensible Markup Language (XML), Cascading Style Sheets (CSS), JavaScript, Asynchronous JavaScript and XML (or other data provider) (AJAX), or the like, or any combination thereof.

Various embodiments of present disclosure relates to processing of a transaction associated with a transaction-oriented application (for instance, a thick-client application explained with the reference to FIG. 1A and a web application explained with the reference to FIG. 13). Referring collectively now to FIGS. 1A and 1B, a transaction processing system is disclosed for processing of transactions associated with an application. For instance, the architecture 110 of FIG. 1A includes the transaction processing system 116, and the architecture 130 of FIG. 1B includes the transaction processing system 136.

In an embodiment, processing a transaction associated with an application includes accessing the application and entering data in various fields of at least one window (or page) of the application. The transaction may be processed in two-steps, where in the first step, data is collated from multiple sources such as portable document format (PDF) documents, emails, excel sheets, images and so on, and the collated data is entered in the relevant fields of the at least one window of the application. The second stage is a data verification stage, where the data entered during the first stage is validated. In an embodiment, the architecture of FIGS. 1A and 1B includes a transaction processing system for instance transaction processing system 116 associated with a thick-client application and the transaction processing system 136 associated with a web application, respectively. The transaction processing systems 116 and 136 are configured to perform at least the second stage, i.e. the data verification of the data entered in the first stage. It will be noted that in alternate embodiments, the transaction processing systems 116 and 136 are configured to facilitate performing the first stage as well as the second stage of data processing.

Herein, it will be noted that for the sake of brevity of description, the transaction processing systems 116 and 136 are shown as embodied in the client and the server in FIGS. 1A and 1B, respectively. However, the transaction processing system associated with a thick-client application may be implemented/embodied external to a client device such as the client 112. Also, the transaction processing system 136 associated with a web based application such as the web application 138 may be implemented/embodied external to an application server such as the application server 134. An example block diagram of the transaction processing system for performing processing of transactions is described further with reference to FIG. 2.

Figure 2:
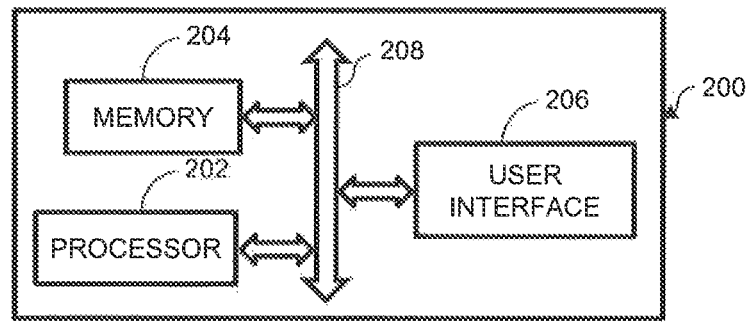
FIG. 2 illustrates an exemplary transaction processing system according to some embodiments of the present disclosure.

FIG. 2 illustrates a block diagram of a system 200 for transaction processing associated with an application, in accordance with an example embodiment. The system 200 may be an example of the transaction processing system 116 (FIG. 1A) and the transaction processing system 136 (FIG. 1B). The application may be a transaction-oriented application and may include at least one window having a plurality of fields and being rendered in a first user interface (UI). Examples of the plurality of fields may include, but are not limited to, drop down field, a textbox field, a checkbox field, a radio button field, and a combination thereof. An example of an application is illustrated and described further with reference to FIG. 3A.

In an example embodiment, the system 200 may be embodied in, or is in direct communication with a computing device. Examples of the computing device may include the client 112 (FIG. 1) and the application server 134 (FIG. 1B). The system 200 includes or is otherwise in communication with at least one processor such as a processor 202, at least one memory such as a memory 204, and a user interface 206. The processor 202, memory 204, and a user interface 206 may be coupled by a system bus such as a system bus 208 or a similar mechanism.

The at least one memory such as the memory 204, may store instructions, any number of pieces of information, and data, used by a computer system, for example the system 200 to implement the functions of the 200. The memory 204 may include for example, volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the system 200 to carry out various functions in accordance with various example embodiments. Additionally or alternatively, the memory 204 may be configured to store instructions which when executed by the processor 202 causes the system 200 to behave in a manner as described in various embodiments.

The at least one processor such as the processor 202 may be implemented as one or more microprocessors, microcomputers, microcontrollers, digital signal processors, central processing units, state machines, logic circuitries, and/or any devices that facilitates in managing access to a financial account. Further, the processor 202 may comprise a multi-core architecture. Among other capabilities, the processor 202 is configured to fetch and execute computer-readable instructions or modules stored in the memory 204. The processor 202 may include circuitry implementing, among others, audio and logic functions associated with the communication. For example, the processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog convertors, and/or other support circuits. The processor 202 thus may also include the functionality to encode messages and/or data or information. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

In an example embodiment, the user interface 206 is in communication with the processor 202. Examples of the user interface 206 include but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the processor 202 is configured to, with the content of the memory 204, and optionally with other components described herein, to cause the system 200 to configure an overlay application corresponding to the application (for example, the application 118 of FIG. 1A or the application 138 of FIG. 1B). The application may be a web-application or a thick-client application. Herein, the overlay application may refer to a replica of the application that may be generated based on information associated with the business operating requirements of the application, where such information is derived from the window control component (for example, the window control components 120 and 144 of FIGS. 1A and 1B respectively) of the application.

In an embodiment, the system 200 is caused to configure the overlay application by accessing a window control component of the application. The window control component of an application is indicative of page layout controls of the application corresponding to a plurality of events associated with transaction processing. For example, for a web application the window control component may include the DOM structure of the web application. Accordingly, for configuring the overlay application for a web application, the system 200 is caused to determine the DOM structure of the web application. In one embodiment, for configuring the overlay application corresponding to the thick-client application, the system 200 may be caused to determine the at least one handler associated with the thick-client application. In an embodiment, the system 200 is caused to configure the overlay application by utilizing screen rendering application programming interface (APIs) which are based on features of underlying operating system of the application. Examples of such features may include resolution, mode of display (size of the window) with/without scroll bars and so on.

In an example embodiment, the processor 202 is configured to, with the content of the memory 204, and optionally with other components described herein, to cause the system 200 to render the application in the first UI. The first UI may include at least one window having a plurality of fields. In an example embodiment, the processor 202 is configured to, with the content of the memory 204, and optionally with other components described herein, to cause the system 200 to facilitate selection of the overlay application corresponding to the application. In an embodiment, the selection of the overlay application may facilitate in rendering the first UI and a second UI, where the first UI renders at least one window of the application and the second UI renders a corresponding at least one window of the overlay application. Herein, it will be noted that the first UI and the second UI may be implemented in the UI 206.

In an embodiment, the system 200 may mask the at least one field of the plurality of fields in the first UI to obtain at least one masked field in the first UI. In an embodiment, the at least one masked field that is rendered in the first UI may be 'key fields'. Herein, the term 'key fields' may refer to those fields that may important or critical from business perspective. For example, the fields that may include transactions of high value may be key fields. Such one or more fields may be rendered as masked in the first UI. The system 200 may be caused to determine various properties and attributes of these 'key fields' from the window control component, and replicate the same properties and attributes in the key fields in the overlay application.

In an example embodiment, the processor 202 is configured to, with the content of the memory 204, and optionally with other components described herein, to cause the system 200 to access a prepopulated data associated with the at least one masked field of the application. Herein, the term 'prepopulated data' may refer to the data that is derived from various sources (such as documents, email, etc.) and populated during a first stage of data entry. For instance, such data may be collated by a maker associate and provided as input in the application. The prepopulated data may be stored in the memory 204 of the system 200. Alternatively, the prepopulated data may be stored in the client and/or the server associated with the application. In an embodiment, the system 200 may access the prepopulated data through the window control component of the application.

In an example embodiment, the processor 202 is configured to, with the content of the memory 204, and optionally with other components described herein, to cause the system 200 to render a second UI corresponding to the at least one window. The second UI includes at least one blank fields corresponding to the at least one masked field of the window rendered in the first UI. An example illustrating the first UI and the second UI is described further with reference to FIG. 3A.

In an example embodiment, the processor 202 is configured to, with the content of the memory 204, and optionally with other components described herein, to cause the system 200 to enable entering data in the at least one blank field in the second UI. In an embodiment, the data may be entered in the at least one blank field by a user. In an example scenario, the user may be a verifier of the data. For instance, the user may assume a checker role for verifying the data. In an embodiment, the user may enter the data in the at least one blank fields by referring to the same source of data that was referred while entering the data (also referred to as prepopulated data) during the first stage of data entry.

In an example embodiment, the processor 202 is configured to, with the content of the memory 204, and optionally with other components described herein, to cause the system 200 to compare the data entered in the at least one blank field with the prepopulated data. In an embodiment, the comparison may be performed by comparing the data entered with the prepopulated data field-by-field. In another example embodiment, the comparison may be performed for all the fields once the data in all the field of the at least one blank field is entered.

In an example embodiment, the processor 202 is configured to, with the content of the memory 204, and optionally with other components described herein, to cause the system 200 to validate the transaction based on the comparison. For example, based on the comparison if the data entered in the second UI is determined to match with corresponding prepopulated data, then the system 200 may be caused to enable at least one validation component. In an embodiment, the UI 206 may include at least one validation component that may be enabled and/or disabled for validating the transaction. Examples of the at least one validation component may include but are not limited to, an approve button, a disapprove/disagree button, a reassign button and so on. In an example embodiment, enabling the validation component may facilitate the user (for example, the checker or the verifier) to enable the transaction. In another embodiment, the enabling the validation component may facilitate in enabling the transaction automatically without user intervention.

In an embodiment, the processor 202 is configured to, with the content of the memory 204, and optionally with other components described herein, to cause the system 200 to disable a validation component that may be configured to validate the transaction on determination of a mismatch between the data entered in the second UI and the corresponding prepopulated data. In an embodiment, the system 200 is caused to maintain the disable state of the validation component until correctness of the data associated with the key fields is ascertained. Additionally or alternatively, the system 200 is caused to enable a validation component that may be responsible for disagreeing with authorizing of the transaction. For instance the system may be caused to enable a 'disagree' button for disagreeing with authorizing of the transaction. Herein, it will be noted that the validation component is not enabled until each of the one or more fields are ascertained to be correct. As is discussed before, since the one or more fields includes key/crucial data associated with the business, it is important to validate all the key data before enabling the validation component. It will also be noted herein that the one or more validation components may include more or fewer of components that the disclosed components. It will also be noted that the one or more validation components may be implemented in various configurations without limiting the scope of various embodiments.

FIGS. 3A-3D illustrates example user interface for transaction processing in accordance with an example embodiment. The user interface may be an example user interface embodied in a client device such as the client 112 (FIG. 1A) and the client 132 (FIG. 1B). The transaction may be related to a business/service/entity/enterprise. In an example scenario, the transaction may be related to a bank, and hereinafter may be referred to as a banking transaction. A system such as the system 200 (FIG. 2) may be configured for processing of the banking transaction. Herein, the term 'transaction processing' may refer to performing a double data entry check for ascertaining the validity of the transaction. In particular, data related to the transaction is collated from various sources and is input in an application. The application may be a transaction-oriented application belonging to the business/entity/enterprise. The data may be manually collated and entered, by for example, an associated (such as a maker associate), and is thus prone to errors. In order to validate the correctness of the data entered, the data may be re-entered in a separate interface. In an embodiment the data is re-entered only for few key-fields and not all of the fields. The data may be re-entered by referring to the same sources of data as was referred by the maker associate. The system, for example, the system 200 (FIG. 2) is configured to compare the re-entered data with prepopulated data (i.e. the data entered by the maker associate), and determine the validity of the data entered. FIGS. 3A-3D illustrates various screens shots for the user interface enabling data entry for the transaction and subsequent processing of the transaction.

Figure 3A:
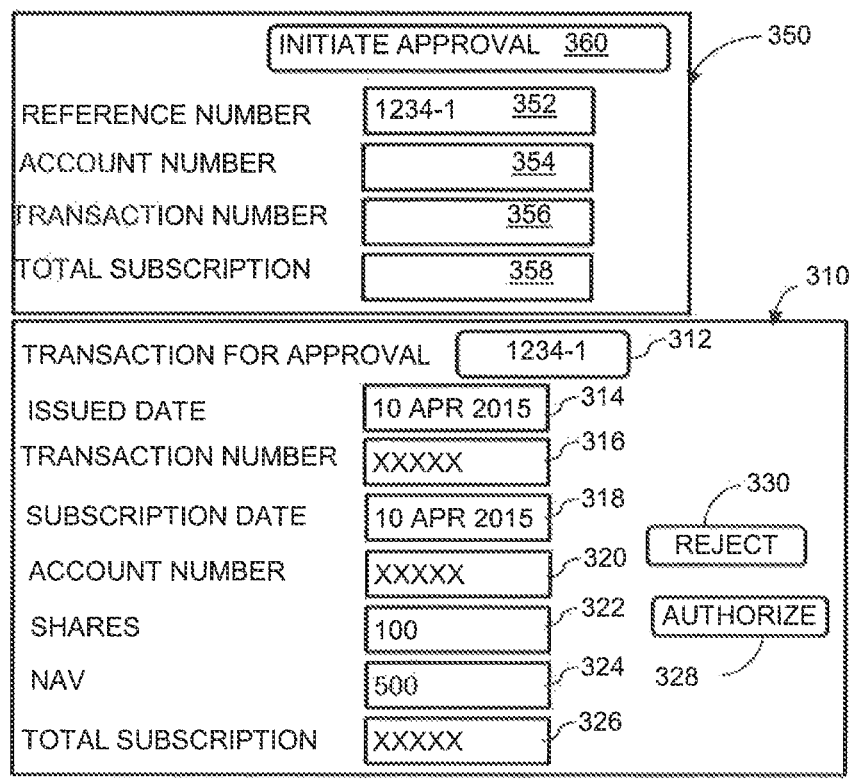
FIGS. 3A-3D illustrates example user interface for transaction processing according to some embodiments of the present disclosure.

Referring to FIG. 3A, UIs such as a first UI 310 and a second UI 350 corresponding to a transaction completed by the maker associate are illustrated. Once the transaction is completed by the maker associate, the transaction is pending for validation, by for example a checker associate. The first UI 310 corresponds to the application, and includes various fields such as a transaction reference field 312, an issue date field 314, a transaction number field 316, a subscription date field 318, an account number field 320, number of shares field 322, NAV field 324, and total subscription amount field 326. From among the plurality of fields displayed in the first UI, at least one field may be masked field. The at least one field is the key-fields associated with the application. For instance, the fields such as the transaction number field 316, account number field 320 and the total subscription amount field 326 may be the key-fields of UI 310, and are therefore masked as shown in FIG. 3A. The first UI 310 further includes validation components such as an 'authorize' component 328 and a 'reject' component 330. The authorize component 328 and the reject component 330 are both disabled at the beginning of initiating an approval process for approving the transaction.

The second UI 350 is presented to the checker associate for validating the transaction. In particular, the second UI 350 is displayed at the client device for initiating approval of the transaction. The second UI 350 includes at least one field of the plurality of fields displayed in the first UI 310. Particularly, the second UI 350 includes those fields from among the plurality of fields of the first UI 310 that may be considered as the key-fields or critical fields pertaining to the transaction. For instance, the fields such as the transaction number field 316, the account number field 320 and the total subscription amount field 326 of the first UI may be replicated in the second UI 350. As illustrated in FIG. 3A, the second UI 350 is shown to include replicated fields such as a transaction reference field 352, an account number field 354, a transaction number field 356, and a total subscription field 358 corresponding to the respective fields of the first UI. It will be noted herein that the system (such as the system 200 of FIG. 2) is configured to determine the key-fields from among the plurality of fields. In accordance with the determination, the system configures the overlay application (presented by the first UI) having only the key-fields that be presented to the marker associate for re-entering the data. As is illustrated in FIG. 3A, the key fields such as fields 316, 320 and 326 in the first UI 310 are masked while the corresponding fields 354, 356, 358 in the second UI 350 which are corresponding to the key fields in the first UI 310 are blank.

The second UI 350 of the overlay application includes an 'initiate approval' component (represented as 360). The initiate approval component 360 facilitates in initiating the entering of the data in the blank fields of the second UI 350. For instance, once a reference number of the transaction is input in the reference number field 352 of the second UI 350, the initiate approval component 360 is activated for enabling entering of the input in various fields of the second UI 350. It will be noted herein with reference to FIG. 3A, that the key-fields in the first UI 310 are masked while the fields corresponding to the key-fields in the second UI 350 are blank. Accordingly, the marker associate is made to fill-in the fields in the second UI 350 of the overlay application.

Figure 3B:
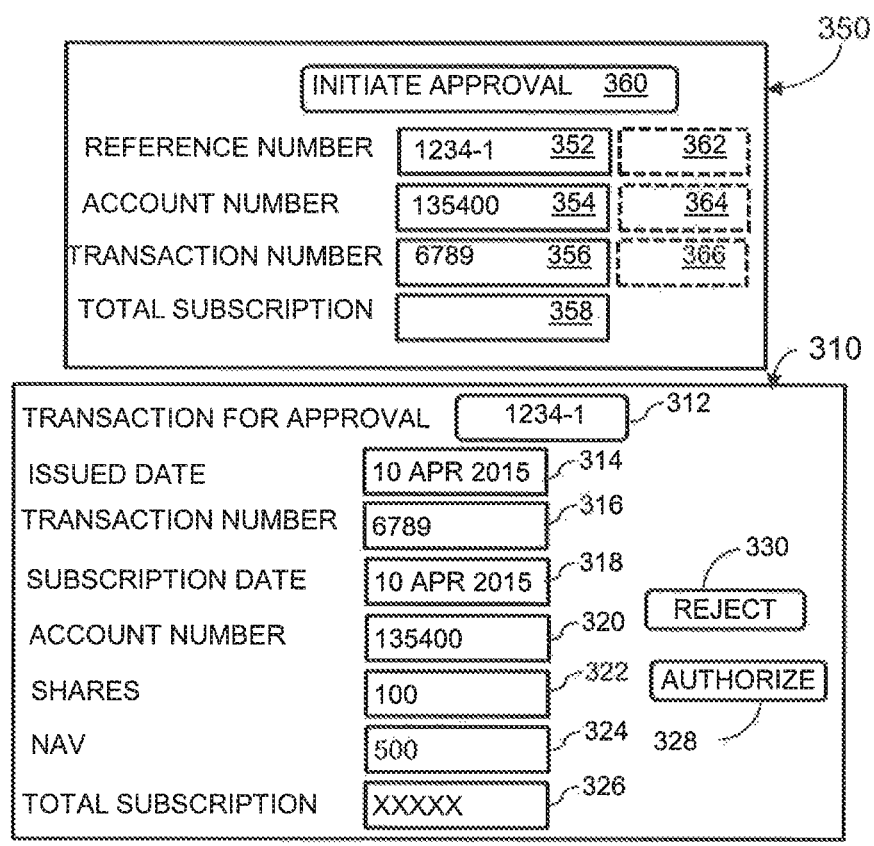
Figure 3C:
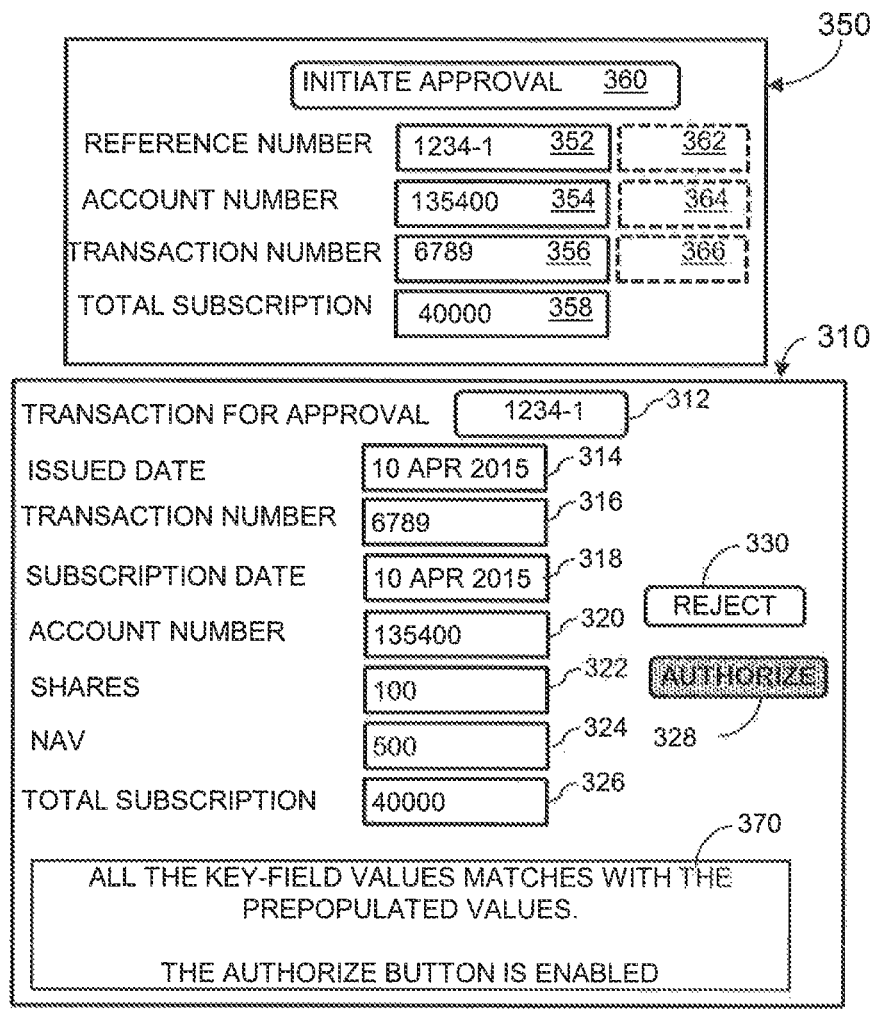
Figure 3D:
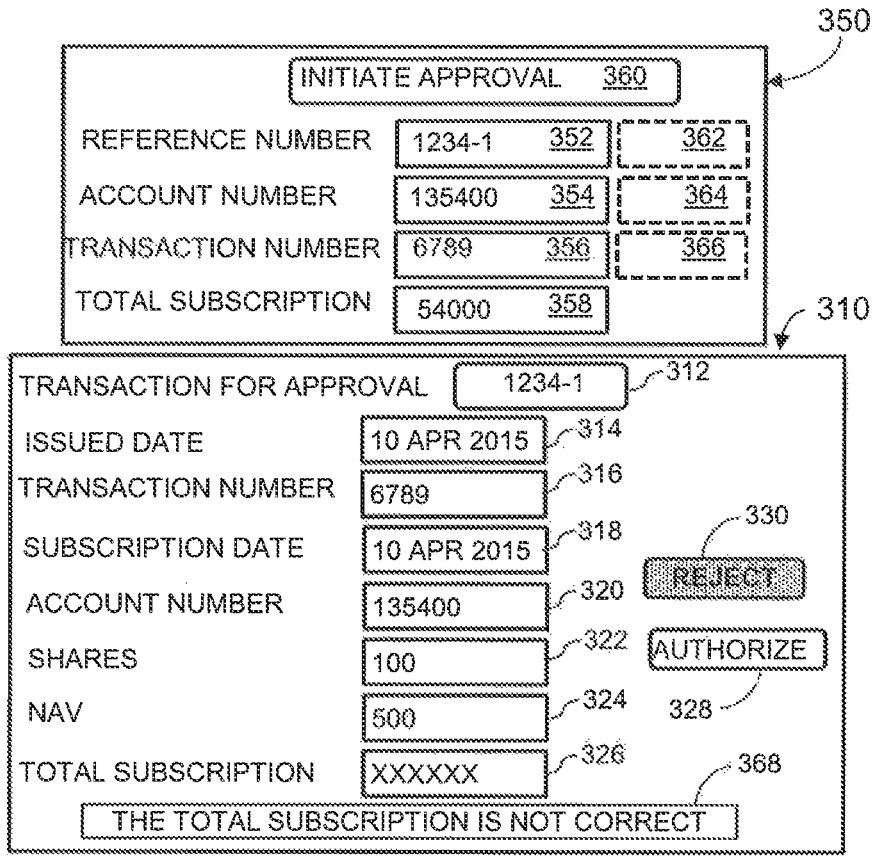

Referring now to FIG. 3B, the key-fields may be filled in the second UI 350 of the overlay application. The system 200 may determine whether the data entered in the key-fields such as fields 352, 354, 356 correspond to the correct data associated with the transaction by comparing the data entered in fields 352, 354, 356 with the corresponding prepopulated data. In an embodiment, the data may be compared field-by-field and a result of comparison may be presented in the UI 350. For instance, the data entered in the reference number field 352 is compared with a corresponding prepopulated data, and based on whether the entered reference number matches with the corresponding prepopulated reference number, a result/notification may be presented in a portion marked as 362. In case the reference number entered in the field 352 matches with the corresponding prepopulated reference number, the notification may include "Reference number is correct", or any similar notification. Similarly, in case the data in the fields 354, 356 and 358 matches with the respective prepopulated data, a notification may be provided corresponding to the respective fields 364, 366 and 368. Once all the data entered in the fields of the second UI 350 matches with the corresponding prepopulated data, a notification may be presented for authorizing the transaction. For instance, referring to FIG. 3C, once the data entered in the fields 352, 354, 356 and 358 matches with the corresponding prepopulated data, respective notifications may be presented in the boxes/spaces marked as 362, 364, 366 and 368. In addition, a notification pertaining to authorization of the transaction may be presented in the second UI 350. For instance, a notification 370 may be presented in the second UI 350 notifying that "All the key-field values matches with the prepopulated values, and the authorize button is enabled", or any similar notification. As is seen from FIG. 3C, the validation component 328, namely "authorize" is enabled by the system upon matching of the data in the key-fields with the corresponding prepopulated data. A user such as a checker associate may provide a user input such as a press at the validation component 328 for authorizing/validating the transaction. In an example embodiment, in response to matching of all of the fields of the second UI 350 with the respective prepopulated data, the validation component may be enabled and may automatically authorize/validate the transaction without user input.

In an embodiment, upon comparing the data if it is determined that the data entered in any of the fields is not matching with the corresponding prepopulated data, a notification may be provided in the space/box 362-368. For instance, referring to FIG. 3D, in case the total subscription entered in the field 358 is not matching with the corresponding prepopulated data associated with the total subscription, a notification indicating that the "The total subscription is not correct" may be provided in the space/box 368. In addition, the validation component 328, namely the "Authorize" button is not enabled. However, the validation component 330, namely the "Reject" button is enabled, and may enable rejection of the transaction.

Figure 4:
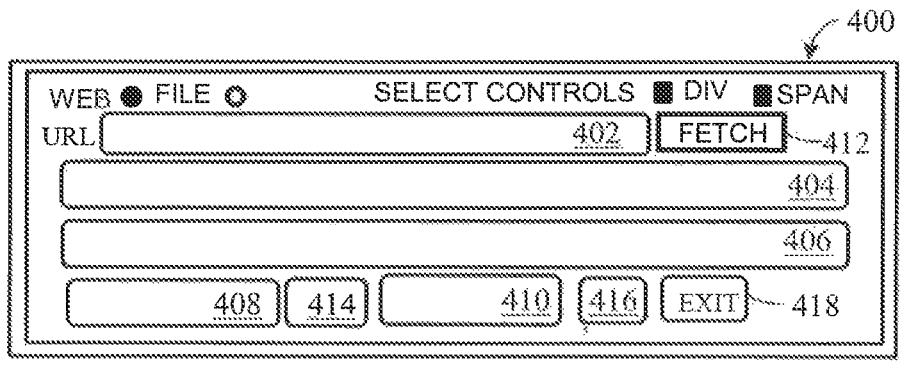
FIG. 4 illustrates a UI for configuring an overlay application corresponding to an application according to some embodiments of the present disclosure.

FIG. 4 illustrates a UI 400 for configuring an overlay application corresponding to an application, in accordance with an example embodiment. Herein, the application may be a web-application or a thick-client application. The overlay application may be configured on top of the application by leveraging inter-process communication associated with the application. In an embodiment, the overlay application may be configured by a system, for instance the system 200 (FIG. 2). The system 200 facilitates in configuring overlay applications for a variety of distinct applications. Since different applications have unique ways of rendering pages, set of fields, buttons, etc., configuring the overlay application for different applications is performed by parsing the contents of said applications and controlling said application based on the knowledge of the contents. In an embodiment, the system 200 is configured to access a window control component of the application, where the window control element is indicative of the page layout associated with the application, and is responsible for controlling the traversal through the application. In an embodiment, the system parse in-memory window control element and determine the logic and data that may exist within the application, for controlling one or more events associated with the application. In an example embodiment, in case the application is a web-application, the system 200 is configured to parse in-memory the DOM structure of the web-application. In another embodiment, in case the application is a thick-client application such as the thick-client application 118 (FIG. 1A), the system 200 is configured to parse in-memory handlers of thick-client application, starting from a root handle.

In an embodiment, the system 200 may include an auto-code generator module that may be capable of accessing the window control element of the application, and automatically configuring the overlay application corresponding to the application. In an embodiment, configuring the overlay application includes determining the details such as application windows, business operating requirements of the application, determining key-fields of the application and replicating the key-fields onto the overlay application along with attributes of these key fields. The system 200 along with the overlay application may work at screen rendering API's which are based on features of underlying operating system and thus they take into account screen characteristics such as resolution, mode of display (size of the window) with/without scroll bars, and so on. Referring to FIG. 4, the UI 400 for automatically generating code for configuring the overlay application corresponding to the application is illustrated.

The UI 400 may include a plurality of windows and a plurality of fields for receiving input associated with the application, and automatically generating a code for configuring the overlay application. For instance, the UI 400 includes an input bar 402 for receiving a URL/web-address of the application, a plurality of windows such as windows 404, 406, 408, 410 and a plurality of controls such as input elements such as 412, 414, and 416.

Once the URL/web-address of the application is provided in the input bar 402, and a fetch button 412 is enabled, a complete code of the application is generated in the window 404. Herein, the code may be retrieved by the system 200, where the system 200 may access a window control element of the application. Additionally, the window 406 includes details of the generated controls in a hierarchical manner. The window 408 includes a list of controls such as hypertext mark-up language (HTML) controls for which the code has to be generated. In an example embodiment, such controls for which the code has to be generated may be determined automatically by the system, for instance the system 200. Alternatively, the controls for which the code has to be generated may be determined based on a user selection. For example, the user may select one or more controls from the list of controls in the window 408 for which the code has to be generated, and click a 'generate code' button 414 on the UI 400. Upon clicking the 'generate code' button 414, a code for the selected controls may be presented in the window 410. The code presented in the window 410 may be copied for use in the overlay application. For instance, the UI may include an element 416 for copying the code generated in the window 410. The copied code may be stored in the memory such as the memory 204 of the system 200. The code may be utilized for configuring the controls of the overlay application.

Figure 5:
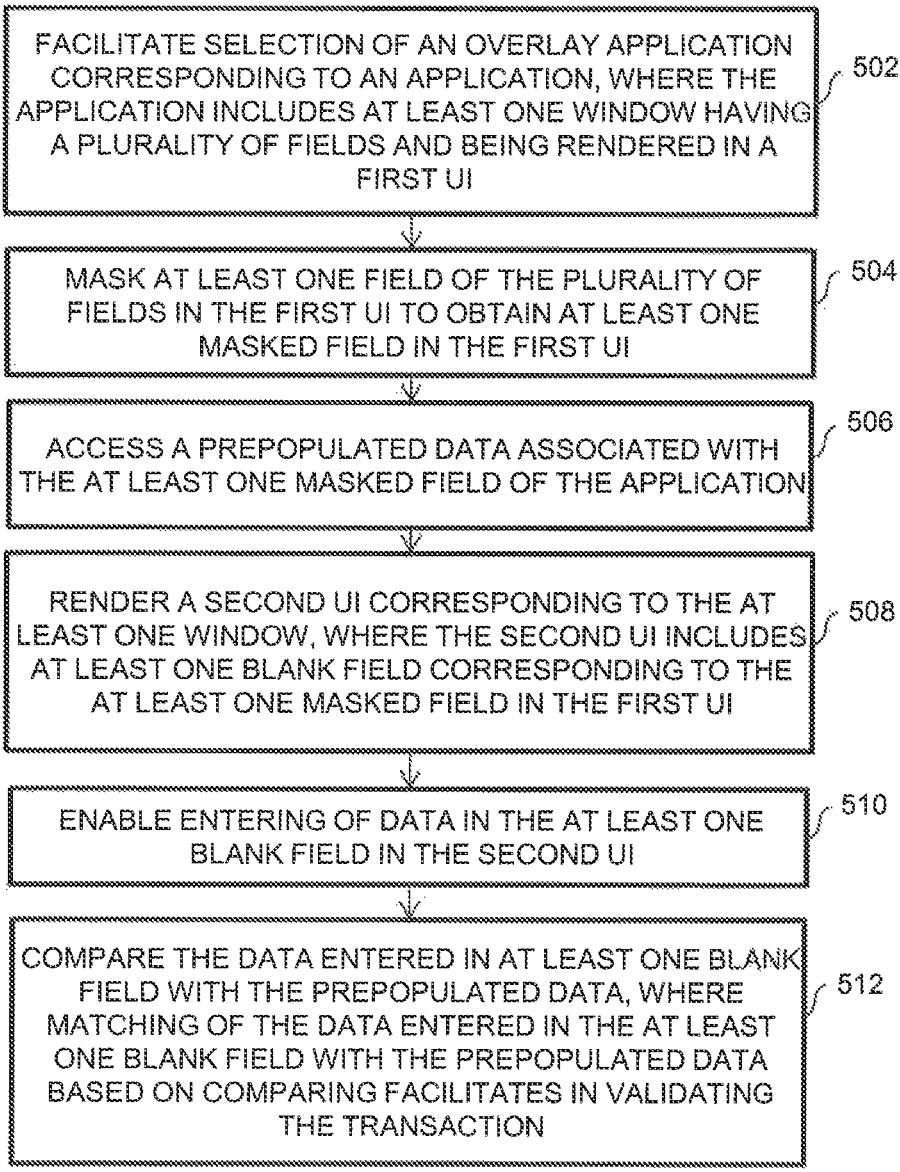
FIG. 5 is a flow diagram illustrating an example method for transaction processing according to some embodiments of the present disclosure.

FIG. 5 is a flow diagram depicting an example method 500 for transaction processing, in accordance with an example embodiment. The method 500 depicted in the flow chart may be executed by a system for example, the system 200 of FIG. 2. In an example embodiment, the system 200 may be embodied in a computing device. A client device, for example, the client device 112 (FIG. 1A) and a server for instance, the server 134 (FIG. 1B) may be the examples of the computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. It will be noted herein that the operations of the method 500 are described with help of system 200. However, the operations of the method 500 can be described and/or practiced by using any other system.

At 502, selection of an overlay application corresponding to an application is facilitated. In an embodiment, the selection of the overlay application is facilitated at a computing device. In an embodiment, the application may include at least one window having a plurality of fields. In an embodiment, the application may be rendered in a first UI (for instance the first UI 310, FIG. 1A). An example of the application being rendered in the first UI is described with reference to FIG. 3A. The first UI 310 may render the at least one window having the plurality of fields of the application. The plurality of the fields of the application may include corresponding prepopulated data. One or more fields of the plurality of the fields may be key fields of the application, and may therefore be validated before approving the transaction.

In an embodiment, the overlay application may be configured on corresponding to the application by accessing a window control component of the application. The window control component for a web application may be a DOM structure, and for the thick-client application the window control component may be at least one handler. It will be noted herein that the overlay application corresponding to the application may be configured prior to the selection of the overlay application. An example of configuring the overlay application and the UI 400 are described with reference to FIG. 4.

At 504, the overlay application causes the first UI of the application to mask the at least one field of the plurality of fields, to obtain one or more masked fields in the first UI. Particularly, a system (such as the system 200 of FIG. 2) associated with the overlay application causes the overlay application to mask the at least one field of the plurality of fields of the first UI. In an embodiment, the at least one field may include key-fields of the first UI. An example UI having the at least one masked fields is illustrated and described with reference to FIG. 3A.

At 506, a prepopulated data associated with the at least one masked field of the application is accessed by the system 200. In an embodiment, the prepopulated data may be stored at the computing device associated with the application. For instance, the prepopulated data may be accessed from the client device 122 (FIG. 1A) in case the application is a thick-client application. As another example, the prepopulated data can be accessed from the client 132 (FIG. 1B) in case the application is a web-application.

At 508, a second UI corresponding to the at least one window is rendered. In an embodiment, the second UI includes at least one blank field corresponding to the at least one masked field in the first UI. An example of the second UI having the at least one blank field is illustrated and described with reference to FIG. 3A.

At 510, entering of data in the at least one blank field in the second UI is enabled. In an example embodiment, the system 200 is caused to enable entering of data in the at least one blank field in the second UI. The data may be entered manually by, for example, a user in a verifier (or checker) role. The user may refer to the original source of data which is utilized for collating the prepopulated data.

At 512, the data entered in the at least one blank field is compared with the prepopulated data. In an example embodiment, in response to matching of data in the fields of the first UI with the respective prepopulated data, a validation component in the first UI may be enabled. In an embodiment, the validation component may be enabled and may automatically authorize/validate the transaction without user input. In another example, the validation component may be enabled and may facilitate the user in authorizing/validating the transaction. If, however, any of the data entered in the second UI is not determined to match with the corresponding prepopulated data, the validation component responsible for approving the transaction is not enabled. Instead, a validation component responsible for rejecting the transaction is enabled. The validation component responsible for rejecting the transaction may be caused to reject the transaction, either manually or automatically.

Various embodiments of the present disclosure provide methods and systems for processing of transactions related to IT applications.

The disclosed methods and systems enables in controlling occurrence of errors in IT application. Every IT application can be different with each having different way of rendering pages, set of fields, field types such as drop down, Textbox, checkbox, radio button, etc. Current systems include substantial manual effort in checking for mismatches and errors. However, the disclosed system provides a technique of automatically and non-interactively (without user intervention) getting the handle to the window of any IT application and getting the required field values, masking/un-masking, clicking (non-invasively navigating) to the required page which is in a way controlling the function of the IT application.

For example, various embodiments provides methods and systems for intelligently configuring overlay application corresponding to the applications and utilizing the overlay application for enabling double data entry of selected key fields of the application in the overlay application. The double data entry of selected key fields in the overlay application facilitates in validating data entered in the applications. In particular, the system enables double data entry for those fields of the application that represents the high value and/or critical fields. The system provides a UI associated with the overlay application for re-entering the data pertaining to the selected key fields. During the re-entry of the data (or entry of the data in the second UI provided by the system), the data entered in the application (rendered on the first UI) is masked. Thus, the system ensures that the data is re-entered by referring to the original source of data and not the data entered (also referred to as "prepopulated data") in the application. In addition, till the time the data is entered in the second UI, a validation component responsible for authorizing the transaction is disabled.

Upon receiving the re-entered data, the system compares the re-entered data with the corresponding prepopulated data to determine whether the re-entered data matches with the corresponding prepopulated data. The system allows for comparing the data field by field, thereby providing specific information regarding the incorrect data (or a mismatch in the data). If the re-entered data is determined to match with the corresponding prepopulated data, the validation component responsible for 'authorizing' the transaction is enabled for authorizing the transaction. In addition, the system may unmask the one or more fields masked in the application. However, if the re-entered data is not determined to match with the corresponding prepopulated data, the validation component responsible for 'rejecting' the transaction is enabled for facilitating in rejecting the transaction. Accordingly, the disclosed system prevents approval/authorization of transactions without matching double data entry of select few key fields, thereby enhancing accuracy of transactions.

Additionally, the system facilitates in configuring overlay applications pertaining to different applications, since each application includes different structure, page configurations, options, field, etc. Accordingly, the system accesses a window control element of the application to determine the logic and data associated with the page configuration of the overlay application, and in accordance configure a customized overlay application pertaining to the application.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular for "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for transaction processing, comprising:
   facilitating, via one or more hardware processors, selection of an overlay application corresponding to an application, the application comprising at least one window having a plurality of fields and being rendered in a first user interface (UI), wherein the application is one of a web-application and a thick-client application;
   configuring, via the one or more hardware processors, the overlay application corresponding to the application, wherein configuring the overlay application comprises:
      accessing, a window control component associated with the application, the window control component being indicative of at least one page layout controls of the application corresponding to a plurality of events associated with the transaction processing, the window control component comprising one of a document object model (DOM) structure for the web-application and at least one handler for the thick-client application; and
      determining, for at least one event of the plurality of events associated with the transaction, the at least one page layout control based on the window control component, wherein determining the at least one page layout control facilitates in configuring the overlay application;
   masking, via the one or more hardware processors, the at least one field of the plurality of fields in the first UI to obtain at least one masked field in the first UI;
   accessing, via the one or more hardware processors, a prepopulated data associated with the at least one masked field of the application, wherein the prepopulated data comprises data derived from a plurality of sources including documents, emails;
   rendering, via the one or more hardware processors, a second UI corresponding to the at least one window, the second UI associated with the overlay application and comprising at least one blank field corresponding to the at least one masked field in the first UI;
   enabling, via the one or more hardware processors, entering of data in the at least one blank field in the second UI; and
   comparing, via the one or more hardware processors, the data entered in the at least one blank field with the prepopulated data for determining whether the data entered matches with the prepopulated data, wherein matching of the data entered in the at least one blank field with the prepopulated data based on comparing facilitates in validating the transaction.

2. The method of claim 1, further comprising providing, via the one or more hardware processors, at least one validation component in the first UI for enabling validation of the transaction, the at least one validation component being enabled upon matching of the data entered in the at least one blank field with the prepopulated data.

3. The method of claim 2, further comprising unmasking, via the one or more hardware processors, the at least one masked field in the first UI upon matching of the data entered in the at least one blank field with the prepopulated data.

4. The method of claim 2, further comprising disabling, via the one or more hardware processors, the at least one validation component of the transaction on determination of a mismatch between the data entered in the at least one blank field and the prepopulated data.

5. The method of claim 1, wherein a field of the at least one blank field comprises a drop down field, a textbox field, a checkbox field, a radio button field, and a combination thereof.

6. The method of claim 1, wherein the at least one blank field comprises at least one key field associated with the transaction.

7. A processor-implemented system for transaction processing, the system comprising:
   a memory storing instructions; and
   one or more hardware processors coupled to the memory, wherein the one or more hardware processors configured by the instructions to:
      facilitate selection of an overlay application corresponding to an application, the application comprising at least one window having a plurality of fields and being rendered in a first user interface (UI), wherein the application is one of a web-application and a thick-client application;
      configure the overlay application corresponding to the application, wherein to configure the overlay application the one or more hardware processors further configured by the instructions to:
         access, a window control component associated with the application, the window control component being indicative of at least one page layout controls of the application corresponding to a plurality of events associated with the transaction processing, the window control component comprising one of a document object model (DOM) structure for the web-application and at least one handler for the thick-client application; and
         determine, for at least one event of the plurality of events associated with the transaction, the at least one page layout control based on the window control component, wherein determining the at least one page layout control facilitates in configuring the overlay application;
      mask the at least one field of the plurality of fields in the first UI to obtain at least one masked field in the first UI;
      access a prepopulated data associated with the at least one masked field of the application, wherein the prepopulated data comprises data derived from a plurality of sources including documents, emails;
      render a second UI corresponding to the at least one window, the second UI associated with the overlay application and comprising at least one blank field corresponding to the at least one masked field in the first UI;
      enable entering of data in the at least one blank field in the second UI; and
      compare the data entered in the at least one blank field with the prepopulated data for determining whether the data entered matches with the prepopulated data, wherein matching of the data entered in the at least one blank field with the prepopulated data based on comparing facilitates in validating the transaction.

8. The system of claim 7, wherein the at least one processor is further configured by the instructions to provide at least one validation component in the first UI for enabling validation of the transaction, the at least one validation component being enabled upon matching of the data entered in the at least one blank field with the prepopulated data.

9. The system of claim 8, wherein the at least one processor is further configured by the instructions to unmask the at least one masked field in the first UI upon matching of the data entered in the at least one blank field with the prepopulated data.

10. The system of claim 9, wherein the at least one processor is further configured by the instructions to disable validation of the transaction on determination of a mismatch between the data entered in the at least one blank field and the prepopulated data.

11. The system of claim 7, wherein a field of the at least one field comprises a drop down field, a textbox field, a checkbox field, a radio button field, and a combination thereof.

12. The system of claim 7, wherein the at least one blank field comprises at least one key field associated with the transaction.

13. A non-transitory computer-readable medium having embodied thereon a computer program for executing a method for transaction processing, the method comprising:
   facilitating selection of an overlay application corresponding to an application, the application comprising at least one window having a plurality of fields and being rendered in a first UI), wherein the application is one of a web-application and a thick-client application;
   configuring, via the one or more hardware processors, the overlay application corresponding to the application, wherein configuring the overlay application comprises:
      accessing, a window control component associated with the application, the window control component being indicative of at least one page layout controls of the application corresponding to a plurality of events associated with the transaction processing, the window control component comprising one of a document object model (DOM) structure for the web-application and at least one handler for the thick-client application; and
      determining, for at least one event of the plurality of events associated with the transaction, the at least one page layout control based on the window control component, wherein determining the at least one page layout control facilitates in configuring the overlay application;
   masking the at least one field of the plurality of fields determined in the first UI to obtain at least one masked fields in the first UI;
   accessing a prepopulated data associated with the at least one field masked fields of the application, wherein the prepopulated data comprises data derived from a plurality of sources including documents, emails;
   rendering a second UI corresponding to the at least one window, the second UI associated with the overlay application and comprising at least one field blank fields corresponding to the at least one field masked fields in the first UI;
   enabling entering of data in the at least one blank field in the second UI; and
   comparing the data entered in the at least one blank field with the prepopulated data for determining whether the data entered matches with the prepopulated data, wherein matching of the data entered in the at least one blank field with the prepopulated data based on comparing facilitates in validating the transaction.

* * * * *